H. A. HASKELL.
NUT CLAMP.
APPLICATION FILED APR. 1, 1919.

1,322,434.

Patented Nov. 18, 1919.

WITNESSES

INVENTOR
H. A. HASKELL
BY
ATTORNEYS

UNITED STATES PATENT OFFICE.

HENRY AUSTIN HASKELL, OF SOUTH BRAINTREE, MASSACHUSETTS.

NUT-CLAMP.

1,322,434.  Specification of Letters Patent.  Patented Nov. 18, 1919.

Application filed April 1, 1919. Serial No. 286,667.

*To all whom it may concern:*

Be it known that I, HENRY A. HASKELL, a citizen of the United States, and a resident of South Braintree, in the county of Norfolk and State of Massachusetts, have invented a new and Improved Nut-Clamp, of which the following is a full, clear, and exact description.

It is well known that considerable annoyance has been experienced with internal-combustion engines, and particularly such engines as applied to an automobile, for the reason that the coupling means, usually consisting of a nut, securing together the exhaust manifold and exhaust pipe, becomes loosened. This permits the exhaust pipe to become entirely disengaged from the manifold, and results in the hot exhaust gases impinging almost directly upon the foot-board of the driver's seat, which may become very dangerous where such foot-board has its underside splashed with oils, and particularly so if the automobile in question is provided with a gasolene tank located in the dash.

Further, should nothing serious result from the loosening of the exhaust pipe, it is a source of considerable annoyance to have to stop the engine for some length of time so that the nut, or other coupling means, may become sufficiently cooled that the same may be handled without burning the hand of the operator.

I have now devised a new and improved form of nut clamp which is particularly adapted to prevent any rotational movement of the nut upon the screw threads of the exhaust manifold, or pipe, such nut serving to couple the two together.

My invention was primarily designed with the above object, but further contemplates the provision of a device of this nature which shall be extremely simple in construction and, consequently, cheap to manufacture, at the same time embodying positive locking means between the exhaust pipe, or manifold, and the nut serving to couple the two together.

My invention finally contemplates a clamp which shall be of such rugged construction as to eliminate any question of the same breaking. To this end I have conceived a clamp which shall fixedly engage either the manifold or the exhaust pipe, at the same time bearing against the outer face of the nut and, consequently, preventing any rotational movement of the same with respect to the manifold, or pipe, upon which it is located.

In the accompanying drawings, I have illustrated one practical embodiment of my invention, and in such drawings—

Figure 1:
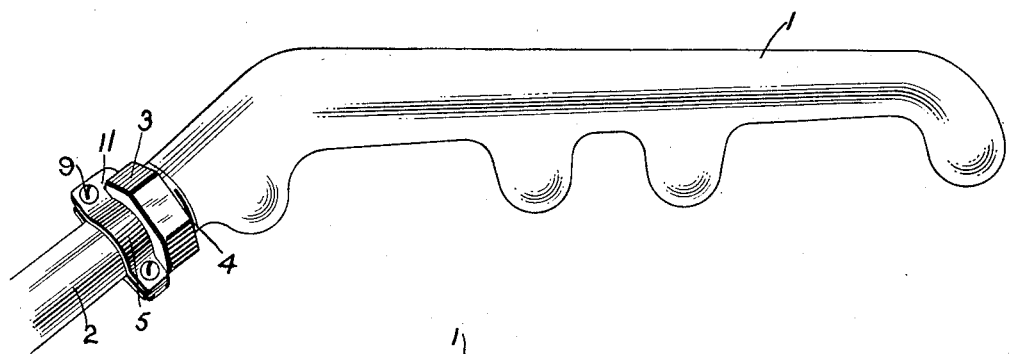
Figure 1 represents an outer elevational view of an exhaust manifold and pipe, together with the coupling nut, my improved clamp being applied to the exhaust pipe and engaging the nut.

In these various views, the reference numeral 1 designates the exhaust manifold of an internal-combustion engine, and 2 the exhaust pipe. Coupling these two members together is a nut, such as is indicated by the reference numeral 3, which nut is secured to the exhaust pipe 2 and engages the screw threads 4 upon the manifold.

The clamp 5 is mounted, in the arrangement illustrated, upon the exhaust pipe, engages one of the outer faces of the nut 3, and prevents rotational movement of such nut with respect to the screw threads 4 or the pipe 2.

Briefly, the construction of the clamp includes a pair of clamping members 6 and 7 provided with outwardly extending ears 8 formed with openings through which extend screw-threaded bolts 9 to whose outer ends are secured the nuts 10, which are held from rotational movement by engaging the inclined portions of the clamping member 6 extending upwardly from the ears 8. An upwardly projecting lug 11 is secured to, or integral with, a clamping member 7, as clearly illustrated.

Figure 2:
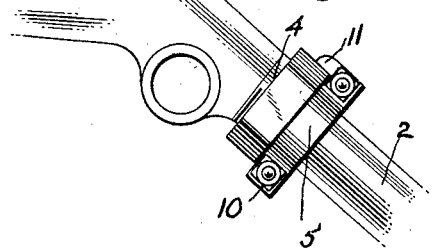
Fig. 2 is a view similar to Fig. 1, but shows an inside view of the various parts.
Figure 3:
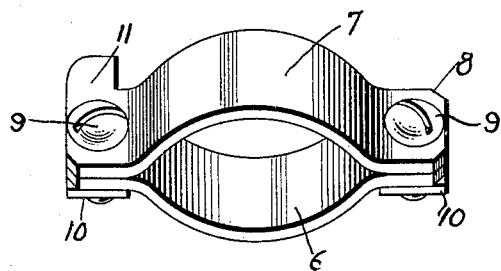
Fig. 3 is a perspective view of my nut clamp.

In operation it will now be seen that the ends of the manifold 1 and exhaust pipe 2 will be brought together and the nut 3 tightened as far as possible, so that the two may be firmly coupled together. Clamping members 6 and 7 are now applied to opposite sides of the exhaust pipe 2, and the bolts 9 inserted through the openings formed through the ears of such clamping members. Nuts 10 are applied to the outer ends of the bolts 9 and the latter are rotated without rendering it necessary that the nuts 10 should be held, by virtue of the fact that such nuts, as aforesaid, engage the inclined portions of the clamping member 6 upon attempting rotational movement. When the bolts 9 have been sufficiently tightened, the clamping member 5 is slid upwardly along the pipe 2, so that the inner edges of the clamping members 6 and 7 lie flush against the inner face of the nut 3, the lug 11 projecting, as indicated in Figs. 1 and 2, over the outer face of the nut 3 and engaging such face. It will now be seen that upon a further tightening of the bolts 9, and a consequently drawing together of the clamping members 6 and 7 around the exhaust pipe 2, any movement of the clamping member 5 in the longitudinal as well as rotary direction will be prevented; and that any possibility of the nuts 10 becoming loosened, so that the clamping member 5 might be rotated or moved in a longitudinal direction, is prevented, in view of the fact that the inclined portions of the clamping member 6 constitute a nut lock, precluding this possibility. It is now obvious, in view of the proven impossibility of the loosening of clamp 5 of its own volition, by reason of an integral or fixed part of such clamp firmly engaging the nut 3, that such nut is also held against any movement.

It will be understood that this nut clamp is not necessarily applicable to the coupling nut between the exhaust pipe and manifold of an internal-combustion engine only, but that the same might be applied to any nut to prevent the rotation thereof, and that, further, although I have illustrated the same applied to an internal-combustion engine, it may serve as a locking means for a coupling nut in any type of engine. Also, in the practical embodiment illustrated in the drawings, I have shown the nut as engaging screw threads upon the manifold, and the clamp mounted upon the exhaust pipe, that the position of these two might readily be reversed.

Having thus described my invention, what I desire to claim is:

1. A nut clamp, including a pair of clamping members formed with ears at their ends, bolts adapted to project through such ears and to draw the same together, and an upstanding lug integral with one of such ears.

2. A nut clamp, including a pair of clamping members formed with a lug adapted to bear against the outer face of a nut, ears provided on the outer ends of such clamping members, bolts extending through such ears, and nuts secured to the outer ends of such bolts, the clamping members incorporating construction whereby to prevent rotational movement of such nuts.

3. A nut clamp, including a pair of clamping members comprising a bowed central portion and outstanding ears at the ends of such central portion, a lug integral with one of such ears, bolts adapted to pass through such ears, and nuts secured to the lower ends of such bolts, the side edges of such nuts being prevented from rotational movement by virtue of their engagement with the bowed portion of the clamping members.

4. A nut clamp, including a pair of clamping members, an upstanding lug associated with such members and being adapted to bear against the outer face of the nut to be locked, and means adapted to draw such clamping members together.

HENRY AUSTIN HASKELL.